(12) United States Patent
Pechera et al.

(10) Patent No.: US 12,448,590 B2
(45) Date of Patent: Oct. 21, 2025

(54) LAUNDRY DETERGENT COMPOSITION

(71) Applicant: Church & Dwight Co., Inc., Princeton, NJ (US)

(72) Inventors: Leilani Pechera, Kendall Park, NJ (US); Steven Adamy, Lawrenceville, NJ (US); Archana Gupta, Belle Mead, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 336 days.

(21) Appl. No.: 17/917,468

(22) PCT Filed: Apr. 6, 2021

(86) PCT No.: PCT/US2021/025864
§ 371 (c)(1),
(2) Date: Oct. 6, 2022

(87) PCT Pub. No.: WO2021/207119
PCT Pub. Date: Oct. 14, 2021

(65) Prior Publication Data
US 2023/0159867 A1    May 25, 2023

Related U.S. Application Data

(60) Provisional application No. 63/006,441, filed on Apr. 7, 2020.

(51) Int. Cl.
*C11D 17/00* (2006.01)
*C11D 1/66* (2006.01)
(Continued)

(52) U.S. Cl.
CPC ............ *C11D 17/043* (2013.01); *C11D 1/662* (2013.01); *C11D 3/3765* (2013.01); *C11D 3/38672* (2013.01)

(58) Field of Classification Search
None
See application file for complete search history.

(56) References Cited

U.S. PATENT DOCUMENTS 4,973,416 A    11/1990 Kennedy
5,341,932 A    8/1994 Chen et al.
(Continued)

FOREIGN PATENT DOCUMENTS

CA    1112534    11/1981
EP    0158464    10/1985
(Continued)

*Primary Examiner* — Necholus Ogden, Jr.
(74) *Attorney, Agent, or Firm* — Church & Dwight Co., Inc.

(57) ABSTRACT

An article is provided including an aqueous gel detergent; and a package for the aqueous gel detergent which is in direct contact with the aqueous gel detergent, wherein the package is formed from a water-soluble, film-forming material. The aqueous gel detergent includes: at least about 40% by weight of water based on the total weight of the aqueous gel detergent; a builder comprising potassium carbonate, wherein the potassium carbonate is present in an amount of at least about 25 weight percent, based on the total weight of the aqueous gel detergent; a polymer; at least one surfactant; and encapsulated enzymes which are suspended in the aqueous gel detergent.

15 Claims, 1 Drawing Sheet

(51) Int. Cl.
    *C11D 3/37*     (2006.01)
    *C11D 3/386*     (2006.01)
    *C11D 17/04*     (2006.01)

(56) References Cited

U.S. PATENT DOCUMENTS

| | | |
|---|---|---|
| 5,431,836 A * | 7/1995 | Carr ............... C11D 3/3761 |
| | | 510/351 |
| 6,387,864 B1 | 5/2002 | Bartelme |
| 6,521,581 B1 | 2/2003 | Hsu et al. |
| 6,632,785 B2 | 10/2003 | Pfeiffer et al. |
| 7,056,876 B2 | 6/2006 | Shamayeli |
| 7,375,070 B2 | 5/2008 | Pegelow |
| 7,424,891 B2 | 9/2008 | Gentschev et al. |
| 7,557,075 B2 | 7/2009 | Fregonese et al. |
| 7,915,213 B2 | 3/2011 | Adamy et al. |
| 8,669,220 B2 | 3/2014 | Huber et al. |
| 8,865,638 B2 | 10/2014 | Adamy |
| 9,187,714 B2 | 11/2015 | Schmiedel et al. |
| 2002/0033004 A1 | 3/2002 | Edwards et al. |
| 2005/0119150 A1 | 6/2005 | Pegelow et al. |
| 2005/0143278 A1 | 6/2005 | Pegelow et al. |
| 2006/0281658 A1 * | 12/2006 | Kellar .................. C11D 3/10 |
| | | 510/438 |
| 2007/0054828 A1 | 3/2007 | Gentschev et al. |
| 2007/0157572 A1 | 7/2007 | Oehms et al. |
| 2012/0097193 A1 | 4/2012 | Rossetto et al. |
| 2013/0065811 A1 | 3/2013 | Fernandez-Prieto et al. |
| 2013/0206638 A1 | 8/2013 | Wong et al. |
| 2016/0090552 A1 | 3/2016 | Loughnane et al. |
| 2019/0144789 A1 | 5/2019 | Bettiol et al. |

FOREIGN PATENT DOCUMENTS

| | | |
|---|---|---|
| EP | 234867 | 9/1987 |
| JP | 61-151029 | 6/1986 |
| JP | 61151032 | 6/1986 |
| KR | 20150059578 | 6/2015 |
| WO | 2015132279 | 9/2015 |
| WO | 2017/091674 | 6/2017 |
| WO | 2018053356 | 3/2018 |
| WO | 2019/123343 | 6/2019 |
| WO | 2020/247351 | 12/2020 |

* cited by examiner

LAUNDRY DETERGENT COMPOSITION

CROSS-REFERENCE TO RELATED APPLICATIONS

The present application is a U.S. National Stage of International Patent Application PCT/US2021/025864 filed Apr. 6, 2021 and claims priority to U.S. Provisional Patent Application No. 63/006,441 filed Apr. 7, 2020. The disclosures of each of the applications noted above are incorporated herein by reference in their entirety.

FIELD OF THE INVENTION

The present invention relates to compositions for use in laundry machines, and more particularly to a gel detergent composition.

BACKGROUND

This invention relates to high water content gel laundry detergents in unit dosage form in a package comprising a water-soluble, film-forming material.

The use of water-soluble film packages to deliver unit dosage amounts of laundry products is well known. Granular detergents and granular bleaches have been sold in this form in the United States for many years. A compact granular detergent composition in a water-soluble film pouch has been described in Japanese Patent Application No. 61-151032, filed Jun. 27, 1986, which is incorporated herein by reference. A paste detergent composition packaged in a water-soluble film is disclosed in Japanese Patent Application No. 61-151029, also filed Jun. 27, 1986. Further disclosures relating to detergent compositions which are either pastes, gels, slurries, or mulls packaged in water-soluble films can be found in U.S. Pat. No. 6,632,785 to Pfeiffer et al., U.S. Pat. No. 8,669,220 to Huber et al., and U.S. Pat. No. 8,865,638 to Adamy et al.; U.S. Pat. App. Pub. Nos. 2002/0033004 to Edwards et al., 2007/0157572 to Oehms et al., and 2012/0097193 to Rossetto et al.; Canadian Patent No. 1,112,534 issued Nov. 17, 1981; and European Patent Application Nos. 158464 published Oct. 16, 1985 and 234867, published Sep. 2, 1987; each of which is incorporated herein by reference. A liquid laundry detergent containing detergents in an aqueous solution is disclosed in U.S. Pat. No. 4,973,416 to Kennedy, U.S. Pat. No. 6,521,581 to Hsu et al., U.S. Pat. No. 7,424,891 to Gentschev et al., and U.S. Pat. No. 7,557,075 to Fregonese et al.; and U.S. Pat. Pub. Nos. 2013/0065811 to Fernandez-prieto et al., and 2013/0206638 to Wong et al.; which are herein incorporated by reference. See, also, U.S. Pat. No. 6,387,864 to Bartelme et al., U.S. Pat. No. 7,056,876 to Shamayeli et al., U.S. Pat. No. 7,915,213 to Adamy et al., and U.S. Pat. No. 9,187,714 to Schmiedel et al.; and U.S. Pat. App. Pub. No. 2006/0281658 to Kellar et al., which disclose high builder compositions in pods and are herein incorporated by reference.

It is generally believed that high water content liquid and gel laundry detergents are incompatible with water-soluble films because of their water content. Thus, the attendant advantages of high water content liquid/gel laundry detergents over other forms of laundry detergents such as granules, pastes, gels, and mulls have not been readily available in water-soluble unit dosage form. The advantages of liquid/gel laundry detergents over granules, pastes, and mulls include their aesthetic appearance and the faster delivery and dispersibility of the detergent ingredients to the laundry wash liquor, especially in a cool or cold water washing process.

The use of a water-soluble alkaline carbonate builder in the detergent composition can help prevent the aqueous detergent composition from dissolving the water-soluble package material. Laundry detergent compositions comprising a water-soluble alkaline carbonate are well-known in the art. For example, it is conventional to use such a carbonate as a builder in detergent compositions which supplement and enhance the cleaning effect of an active surfactant present in the composition. Such builders improve the cleaning power of the detergent composition, for instance, by the sequestration or precipitation of hardness causing metal ions such as calcium, peptization of soil agglomerates, reduction of the critical micelle concentration, and neutralization of acid soil, as well as by enhancing various properties of the active detergent, such as its stabilization of solid soil suspensions, solubilization of water-insoluble materials, emulsification of soil particles, and foaming and sudsing characteristics. Other mechanisms by which builders improve the cleaning power of detergent compositions are less well understood. Builders are important not only for their effect in improving the cleaning ability of active surfactants in detergent compositions, but also because they allow for a reduction in the amount of the surfactant used in the composition, the surfactant being generally much more costly than the builder.

Sodium carbonate ($Na_2CO_3$) and/or potassium carbonate ($K_2CO_3$) are the most common carbonates included in laundry detergents to impart increased alkalinity to wash loads, thereby improving detergency against many types of soils. In particular, soils having acidic components e.g. sebum and other fatty acid soils, respond especially well to increased alkalinity.

While laundry detergents containing a relatively large amount of carbonate builder are generally quite satisfactory in their cleaning ability, the use of such carbonate builders often results in the problem of calcium carbonate precipitation, which may give rise to fabric encrustation due to the deposition of the calcium carbonate on the fiber surfaces of fabrics which in turn causes fabric to have a stiff hand and gives colored fabrics a faded appearance. Thus, any change in available carbonate built laundry detergent compositions which reduces their tendency to cause fabric encrustation is highly desirable.

In many applications, it is desirable to include $Na_2CO_3$ and $K_2CO_3$ in detergent formulations at levels greater than 20%. This is readily achieved in the case of a powdered detergent. However, incorporating such large amounts into an aqueous liquid is much more difficult. In liquid/gel laundry detergent compositions, the incorporation of a large amount of detergent builder poses a significant formulation challenge since the presence of a major quantity of detergent builder inevitably causes the detergent composition to phase separate. Liquid/gel detergent formulations that contain a detergent builder ingredient require careful control of the surfactant to builder ratio so as to prevent salting-out of the surfactant phase. Liquid/gel laundry detergent compositions are also susceptible to instability under extended freeze/thaw and high/low temperature conditions.

Additionally, sodium carbonate forms an extensive array of low water soluble hydrates at low temperatures and high, i.e., >15 wt. % levels of the sodium carbonate builder. For example, a system with 20% carbonate builder will form a decahydrate phase below 23° C. At 30% sodium carbonate, the decahydrate will form below 31° C. Therefore, even at room temperature, systems containing greater than 20% carbonate builder are inherently unstable and readily form decahydrate phases. Once the decahydrate forms, redissolution can take an inordinate amount of time.

Accordingly, there is still a desire and a need to provide a stable laundry detergent that is still suitable for use in forming dose packs or pods with a water-soluble, film-forming material, which is in direct contact with the gel laundry detergent.

SUMMARY OF THE INVENTION

In one aspect of the present invention, an aqueous gel detergent is provided. The aqueous detergent compositions described herein comprise a unique polymer that is stable in a laundry formulation having a high water content (e.g., 50-65 wt. %), high builder/salt level (e.g., 25-35 wt. % potassium carbonate), electrolyte-tolerant surfactants (e.g., 1-15 wt. %), and encapsulated enzymes (e.g., 1-5 wt. %). The high-water gel formulations described herein do not dissolve the encapsulated enzymes. The formulations described herein are capable of forming a homogeneous clear or opaque formulation that does not dissolve the water-soluble poly(vinyl alcohol) (PVOH) film encapsulating the formulation prior to use.

An article is also provided herein, the article comprising an aqueous gel detergent composition as described herein, and a package for the aqueous gel detergent which is in direct contact with the aqueous gel detergent, wherein the package is formed from a water-soluble, film-forming material. In some embodiments, the water-soluble film-forming material is polyvinyl alcohol.

The invention includes, without limitation, the following embodiments.

Embodiment 1: An article comprising: an aqueous gel detergent; and a package for the aqueous gel detergent which is in direct contact with the aqueous gel detergent, wherein the package is formed from a water-soluble, film-forming material; wherein the aqueous gel detergent comprises: at least about 40% by weight of water based on the total weight of the aqueous gel detergent; a builder comprising potassium carbonate, wherein the potassium carbonate is present in an amount of at least about 25 weight percent, based on the total weight of the aqueous gel detergent; a polymer; at least one surfactant; and encapsulated enzymes, wherein the encapsulated enzymes are suspended in the aqueous gel detergent.

Embodiment 2: The article according to Embodiment 1, wherein the aqueous gel detergent further comprises at least one enzyme which is stable at an alkaline pH.

Embodiment 3: The article according to any of Embodiments 1-2, wherein the encapsulated enzymes are selected from the group consisting of protease, amylase, mannanase, and a combination thereof.

Embodiment 4: The article according to any of Embodiments 1-3, wherein the at least one surfactant comprises: a first surfactant, wherein the first surfactant is an anionic surfactant; and a second surfactant, wherein the second surfactant is a nonionic surfactant.

Embodiment 5: The article according to Embodiment 4, wherein the second nonionic surfactant and the first anionic surfactant are present in a weight ratio of about 4:1 of nonionic surfactant to anionic surfactant, on a percent actives basis.

Embodiment 6: The article according to any of Embodiments 1-3, wherein the at least one surfactant includes alkylpolyglucoside and alkyl ether sulfate.

Embodiment 7: The article according to Embodiment 6, wherein the alkylpolyglucoside and alkyl ether sulfate are present in a weight ratio of about 4:1 of alkylpolyglucoside to alkyl ether sulfate.

Embodiment 8: The article according to any of Embodiments 1-7, wherein the at least one surfactant is present in an amount of about 2% to about 25% percent by weight based on the total weight of the aqueous gel detergent.

Embodiment 9: The article according to any of Embodiments 1-8, wherein the water is present in an amount of about 50 to about 65 weight percent, based on the total weight of the aqueous gel detergent.

Embodiment 10: The article according to any of Embodiments 1-9, wherein the aqueous gel detergent further comprises at least one enzyme stabilizer.

Embodiment 11: The article according to Embodiment 10, wherein the at least one enzyme stabilizer is glycerin.

Embodiment 12: The article according to any of Embodiments 1-11, wherein the water-soluble film-forming material is polyvinyl alcohol.

Embodiment 13: The article according to any of Embodiments 1-12, wherein the polymer is a moderately cross-linked hydrophobically-modified acrylic acid polymer.

Embodiment 14: The article according to any of Embodiments 1-13, wherein the polymer is Carbopol®.

Embodiment 15: A method of preparing an aqueous gel detergent composition, comprising: mixing a polymer with water, wherein the aqueous gel detergent comprises at least about 40% by weight of water based on the total weight of the aqueous gel detergent; adding at least one surfactant to the mixture of the polymer and the water; adding a builder comprising potassium carbonate to the mixture of the polymer, the water, and at least one surfactant, wherein the potassium carbonate is present in an amount of at least about 25 weight percent, based on the total weight of the aqueous gel detergent; allowing the mixture of the polymer, the water, the at least one surfactant, and the builder to cool to room temperature; and adding encapsulated enzymes to the cooled mixture of the polymer, the water, the at least one surfactant, and the builder, wherein the encapsulated enzymes are suspended in the aqueous gel detergent.

Embodiment 16: The method according to Embodiment 15, further comprising encapsulating the aqueous gel detergent composition in a package for the aqueous gel detergent which is in direct contact with the aqueous gel detergent, wherein the package is formed from a water-soluble, film-forming material.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

Other aspects and advantages of the present invention will become apparent from the following.

DETAILED DESCRIPTION OF THE INVENTION

Figure 1:
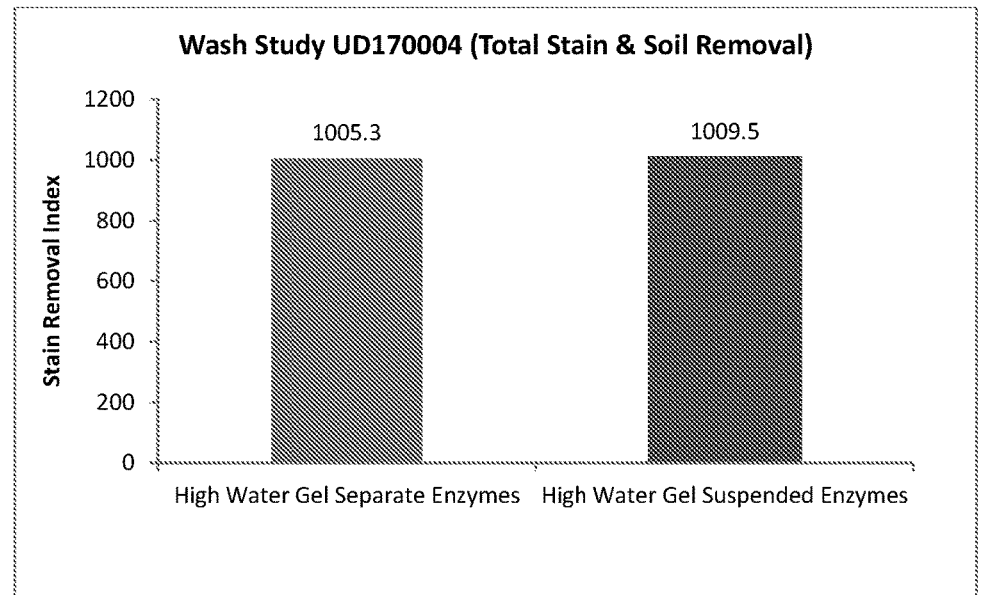
FIG. 1 is a bar graph showing a comparison of stain removal of a gel with suspended enzymes vs. a gel and separate enzymes.
Figure 2:
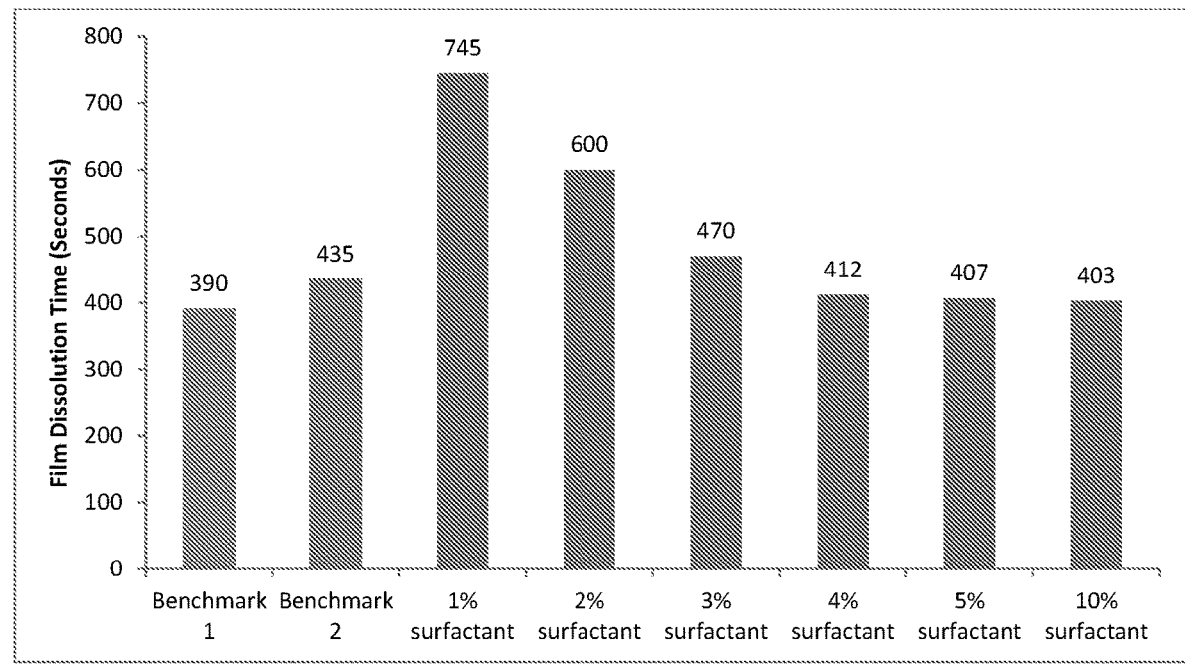
FIG. 2 is a bar graph showing the effect of surfactant concentration on cold water film dissolution time (seconds).

The present disclosure now will be described more fully hereinafter with reference to the accompanying drawings. The disclosure may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural references unless the context clearly dictates otherwise.

As described above, commercially-available unit dose laundry pods typically contain low-water content due to the water solubility of the PVOH film enclosing the formulation. In the high-water gel formulations described herein, potassium carbonate can be used as a water-binding agent that prevents solubilization of the surrounding PVOH film. The high-water content may provide cost-saving options as water replaces expensive surfactants and solvents. As described in more detail below, it was surprisingly found that certain polymers can be included in the detergent composition to form a gel that is stable at high-levels of the water-binding agent. Without being limited by theory, by "binding water" in the gel formulation, suspended encapsulated enzymes can remain stable/active. Other detergent/additive actives may be suspended in the gel, thereby expanding the possible uses of the unit dose gel pods described herein (e.g., for cleaning/detergent applications as well as additive/fabric care applications).

In one aspect of the present disclosure, an article is provided, the article for use in the laundry process comprising a gel detergent and a package for the gel detergent. More particularly, the article is an aqueous, organic solvent free, gel laundry detergent contained in a package, preferably a pouch or packet, containing a unit dose of the gel laundry detergent, the package comprising a water soluble film-forming material that dissolves when placed in the laundry wash water so as to release the gel laundry detergent. As used herein, terms such as "package", "pod", "pouch", and the like can be used interchangeably to describe the water-soluble film forming the article enclosing gel laundry detergents described herein. According to the invention, the water-soluble film-forming material is in substantially direct contact with the gel laundry detergent, with the film-forming material maintaining its structural integrity prior to external contact with an aqueous medium, such as a laundry wash liquor. The gel detergent is capable of remaining homogeneous over a relatively wide temperature range, such as might be encountered in storage, and the pouch is capable of dissolution in water even after extended storage.

The water-soluble package of this disclosure can preferably be made from polyvinyl alcohol, but can also be cast from other water-soluble materials such as polyethylene oxide, methyl cellulose and mixtures thereof. Suitable water-soluble films are well known in the art and are commercially available from numerous sources.

The gel laundry detergent package itself can be of any configuration, but conveniently may have a rectangular or square shape when viewed normally to the plane of its two longest dimensions. A rectangular or square packet is more easily manufactured and sealed than other configurations when using conventional packaging equipment.

The gel laundry detergents of the present disclosure are formulated in a manner which makes them compatible with the water-soluble film for purposes of packing, shipping, storage, and use. Without being limited by theory, compatibility of the gel laundry detergent with the water-soluble film can be achieved by the use of at least one appropriate polymer in the gel laundry detergent. As described herein, embodiments of the invention relate to an aqueous gel detergent, which can be encapsulated in a water-soluble package. In particular, various embodiments of the present invention relate to an aqueous gel detergent comprising a water-soluble alkaline carbonate builder, at least one polymer, at least one surfactant, and a plurality of suspended encapsulated enzymes. The formulations are essentially homogenous (show substantially no phase separation) for an extended time period and temperature range. In certain embodiments, the detergent can be clear. In some embodiments, the detergents provided herein are not clear transparent gels, but are rather turbid and in the form of a paste or gel. Without being limited by theory, it is noted that varying the level of certain surfactant(s) (e.g., Steol®, an anionic surfactant) can affect the solubility of the carbonate builder in the detergent composition and thereby affect whether the detergent composition is clear or opaque. Similarly, certain enzymes can also affect whether the detergent composition is clear or opaque. While homogeneity of the formulations provides a desirable product appearance, phase separation can also be a product performance issue, since both phases in a phase-separated system may not disperse and dissolve rapidly during the wash cycle, although the formulation may have dispersed and dissolved rapidly before phase separation occurred.

In various embodiments, the gel laundry detergent is a concentrated, heavy-duty gel detergent which can contain at least about 25 weight percent of water, at least about 40 weight percent of water, or at least about 50 weight percent of water, based on the weight of the overall detergent composition. In some embodiments, water can be present in an amount of about 25 weight percent to about 70 weight percent, about 35 weight percent to about 65 weight percent, or about 50 weight percent to about 65 weight percent, based on the total weight of the detergent composition.

In various embodiments, the gel laundry detergent comprises at least one polymer. Without being limited by theory, a polymer component in the detergent compositions described herein can provide for stable suspension of encapsulated enzymes within the composition. In some embodiments, the polymer can be selected from the group consisting of: superabsorbent polymers (e.g., polyacrylates or acrylate-acrylamide copolymers); acrylic/acrylate polymers & copolymers (e.g., with vinyl pyrrolidone) that were either a) crosslinked, b) mixtures (e.g., with paraffinum liquidum or hydrogenated polydecene, and trideceth-6), or c) with pendant associative groups; hydrophobically-modified alkali swellable emulsion polymer (e.g., HASE thickeners); cationic polymer mixtures (e.g., polyquaternium-37+propylene glycol dicaprylate/dicaprate and PPG-1 Trideceth-6); hydroxyethylcelluloses; hydroxyropylcelluloses; hydroxypropyl methylcelluloses; xanthan gums; diutan gums: inulins; nonionic polyols; polyamides; cellulon cellulose polymer; and combinations thereof.

Without being limited by theory, detergent compositions disclosed herein can include a high concentration (e.g., about 30 wt. %) of a carbonate builder (e.g., potassium carbonate) in order to delay or prevent dissolution of the encapsulating water-soluble PVOH film. However, the high concentration of a carbonate builder can be incompatible with certain polymers, meaning phase separation can be observed in the gel detergent. It was surprisingly discovered that the polymer Carbopol ETD2623, a moderately cross-linked hydrophobically-modified acrylic acid polymer, was stable (i.e., did not demonstrate any phase separation in the detergent formulation) with high-levels of a carbonate builder (e.g., potassium carbonate).

The gel detergents of the present disclosure can comprise a polymer in an amount of about 0.5% to about 5% by weight, about 1% to about 3% by weight, or about 1% to about 2% by weight, based on the total weight of the aqueous gel detergent. In certain embodiments, the detergent composition can comprise a polymer in an amount of at least about 0.5% by weight, at least about 1% by weight, or at least about 2% by weight, based on the total weight of the aqueous gel detergent.

In various embodiments, the gel detergents of the present disclosure can comprise at least one enzyme suspended in the gel. Without being limited by theory, a high concentration of the carbonate builder (e.g., potassium carbonate) in the formulations described herein can provide a gel formulation having a relatively high ionic strength and a highly alkaline pH (e.g., in the range of about 12-13). Conventionally, these conditions are not compatible with enzymes typically used in laundry detergent formulations. However, as described above and provided in the Examples below, the presence of at least one polymer can provide stability for encapsulated enzymes in the formulations of the present disclosure. In various embodiments, the encapsulated enzyme can be protease, amylase, mannanase, or a combination thereof. In certain embodiments, the gel formulation can include at least one high-pH-stable enzyme (e.g., stable at a pH of 12-13).

The gel detergents of the present disclosure can comprise an encapsulated enzyme in an amount of about 0.5% to about 5% by weight, about 1% to about 3% by weight, or about 1% to about 2% by weight, based on the total weight of the aqueous gel detergent. In certain embodiments, the detergent composition can comprise an encapsulated enzyme in an amount of at least about 0.5% by weight, at least about 1% by weight, or at least about 2% by weight, based on the total weight of the aqueous gel detergent.

The gel detergent compositions of the present disclosure include at least one carbonate builder. The water-soluble alkaline carbonate builder in the detergent composition (also referred to herein as a "water-binding agent") can comprise, for example, an alkali metal carbonate, bicarbonate, or sesquicarbonate (preferably sodium or potassium carbonate, bicarbonate, or sesquicarbonate), or mixtures thereof. In certain embodiments, the builder comprises potassium carbonate. The presence of the builder in the formulation renders the aqueous gel detergent non-solubilizing relative to the water-soluble pouch (made from, for example, polyvinyl alcohol and/or polyvinyl acetate). As such, the presence of the builder results in compatibility between the pouch and the formulation by preventing the aqueous detergent from dissolving the water-soluble package the aqueous detergent is stored within. The builder (e.g., potassium carbonate) also allows for the detergent composition to comprise a higher water content than the water content of many conventional detergent packages. The high water content of the formulations of the present invention, in addition to allowing rapid dispersion and dissolution in the wash cycle, can result in a significant cost reduction, thereby making a pouch-type detergent available to the consumer at a significantly lower price.

The aqueous gel detergents of the present disclosure can comprise a builder in an amount of about 15% to about 50% by weight, about 20% to about 40% by weight, or about 25% to about 35% by weight, based on the total weight of the aqueous gel detergent. In certain embodiments, the detergent composition can comprise a builder in an amount of at least about 15% by weight, at least about 25% by weight, or at least about 30% by weight, based on the total weight of the aqueous gel detergent.

The presence of the builder in the detergent composition can render the composition susceptible to phase changes and separations before the composition reaches its final homogeneous form. However, the surfactants selected in embodiments of the compositions described herein (e.g., alkylpolyglucosides) are highly salt-tolerant or electrolyte-tolerant, and as such, the compositions described herein do not exhibit phase separation when the builder (e.g., potassium carbonate) is added.

Some embodiments of the aqueous gel detergent compositions described herein can comprise at least one surfactant. For example, the detergent compositions can comprise a nonionic surfactant, an anionic surfactant, or combinations thereof. In some embodiments, it can be advantageous for a nonionic surfactant to be present in an amount of at least 50% by weight based on the total weight of surfactant employed. As is understood by those skilled in the art, nonionic surfactants lower the critical micelle concentration, and achieve superior oil removal. This ratio of 50% nonionic surfactant to total surfactant present can also act to minimize phase separation within the pouch, as well as to enhance detergency, particularly in hard water.

In various embodiments, the detergent compositions described herein comprise at least one anionic surfactant and at least one nonionic surfactant. The weight ratio of the nonionic surfactant to the anionic surfactant can be about 99:1 to about 70:30, or about 90:10 to about 75:25. In certain embodiments, the weight ratio of the nonionic surfactant to the anionic surfactant can be about 80:20, based on the percentage of each surfactant that is active. It is noted that commercially available surfactants may be diluted or mixed with additional ingredients beyond the surfactant actives (e.g., water). For consistency, the weight ratio of the surfactants is referring to the weight ratio of the surfactant actives.

In certain embodiments, the composition can comprise at least one surfactant selected from the group consisting of sodium laureth sulfate having 2-5 moles ethylene oxide (e.g., Steol® products available from Stepan Company), alkylpolyglucosides, alkyl ether sulfates, alkoxylated carboxylates, and alkyldiphenyloxide disulfonates. In certain embodiments, the aqueous gel detergent composition can comprise Steol® (an alkyl ether sulfate, an anionic surfactant) and Glucopon (an alkylpolyglucoside, a nonionic surfactant).

In various embodiments, the total amount of active surfactants in the detergent composition (i.e., nonionic and/or anionic surfactant) can be about 1-25 weight percent, about 1-15 weight percent, about 1-10 weight percent, about 1-5 weight percent, about 5-15 weight percent, or about 10-15 weight percent, based on the total weight of the aqueous gel detergent. In certain embodiments, the total amount of active surfactants in the detergent composition can be at least about 1% by weight, at least about 5% by weight, at least about 10% by weight, or at least about 15% by weight based on the total weight of the aqueous gel detergent.

Various embodiments of the detergent compositions described herein can include additional ingredients conventionally found in detergent compositions. For example, the detergent compositions can include enzyme(s), dye(s), chelating agent(s), antiredeposition polymer(s), fluorescent whitening agent(s), fragrance(s), buttering agent(s), etc. In general, additional ingredients in the gel detergent compositions can be present in an amount of about 0.1 to about 10 weight percent, or about 1 to about 8 weight percent. In some embodiments, additional ingredients can be present in an amount of less than about 10 weight percent, less than about 8 weight percent, less than about 5 weight percent, less than about 3 weight percent, or less than about 1 weight percent, based on the total weight of the aqueous detergent composition.

A method of preparing an aqueous gel detergent is also provided herein. Generally, the method of preparing the detergent composition can include mixing at least one polymer with water. After complete dispersion and hydration of the at least one polymer for formation of a gel, the remaining ingredients of the detergent composition can be added to the gel and mixed at an elevated temperature. For example, the detergent composition gel can be mixed at a temperature of at least about 30° C., at least about 35° C., at least about 40° C., at least about 50° C., or at least about 60° C. After the gel has cooled to room temperature (e.g., about 20-25° C.), encapsulated enzymes can be mixed into the gel. The resulting gel with suspended enzymes can then be enclosed into pods by heat-sealing the pod-encapsulating film. The order of addition of the ingredients of the detergent composition can be such that (1) the polymer is first added to the water; (2) the builder (e.g., potassium carbonate) is added after the surfactants; and (3) the enzymes are added after the addition of the builder and after the cooling of the mixture after the builder is added.

In some embodiments, a method of preparing gel detergent comprises first pre-mixing at least one polymer and water, and then mixing a surfactant such as Steol® with the water/polymer mixture. Optionally, additional surfactants can be added. Next, additional ingredients such as a chelating agent (e.g., EDTA) and a bittering agent (e.g., Bitrex) can be added and mixed into the mixture. Next, a builder (e.g., potassium carbonate) in solid form can be added to the mixture. Finally, glycerin can be added to the mixture. The mixture can then be mixed at a high speed of mixing to create a homogeneous solution. It is noted that the addition of potassium carbonate to the mixture results in an exothermic solution, which should be allowed to cool down to room temperature prior to the addition of enzymes that can be denatured at higher temperatures.

In some embodiments, the method of preparing an aqueous gel detergent can further include preparing a detergent article by placing a measured amount of the aqueous gel detergent into a package for the aqueous gel detergent. As discussed in more detail above, the package can be in direct contact with the aqueous gel detergent. Furthermore, the package can be formed from a water-soluble, film-forming material, however, the film-forming material is insoluble with respect to the aqueous gel detergent contained within the package. After placing a measured amount of the aqueous gel detergent into the package, the water-soluble, film forming material of the package can be heat sealed in order to close the detergent within the package.

EXPERIMENTAL

Example 1

A unit dose of gel laundry detergent according to the present disclosure was prepared.

The gel formula was prepared by first slowly adding Carbopol ETD2623 polymer in a beaker containing water with an overhead mixer set at 500 RPM. After complete dispersion and hydration of the polymer and formation of the gel, the other ingredients were added, maintaining the mixer speed at 500 RPM. The encapsulated enzymes were mixed into the gel after the gel cooled down to room temperature. The resulting gel with suspended enzymes was enclosed in pods by heat-sealing PVOH film. Table 1 below is an example formulation of the gel laundry detergent.

TABLE 1

Unit Dose of Laundry Detergent Formulation Comprising Polymer Component and Encapsulated Enzymes

| Ingredient | Weight % |
| --- | --- |
| Water | 50-65% |
| Carbopol polymer | 1-3% |
| Glycerine | 4-6% |
| Alkyl ether sulfate | 0.1-1.5% |
| Alkylpolyglucoside | 4-6% |
| Potassium Carbonate | 25-35% |
| Dye | 0.01-0.1% |
| Encapsulated enzymes | 0.1-3% |
| Totals | 100 |

Evaluation of Carbopol ETD2623 for unit dose application showed the following characteristics: a) formula phase stability at high (~30 wt %) potassium carbonate concentration; b) polymer stability at elevated temperature (e.g., 60° C.) in the presence of high (~30 wt %) potassium carbonate concentration; and c) pod stability (formula+film stability) at room temperature (RT) and after seven cycles of 50° C.-RT.

Example 2

Qualitative protease assay testing was done for a gel detergent formulation prepared according to Example 1 above.

The qualitative protease assay utilized the protease enzymatic action on a non-colored AAPF substrate (N-succinyl-ala-ala-pro-phe-p-nitroanilide) forming a yellow colored product p-nitroaniline. The yellow color indicated that the protease enzyme remained active in the formulation.

Tris Buffer solution was prepared, containing 0.1M Tris (hydroxymethyl) aminomethane, 0.01M calcium chloride, and 0.005% Triton X-100. Hydrochloric acid was used to adjust the pH to 8.6. The resulting solution was filtered through 0.45μ filter membrane. A Stock Substrate solution (20 mg/mL) was prepared in a scintillation vial by dissolving 200 mg of the AAPF substrate in 10 mL dimethylsulfoxide (DMSO). A Working Substrate solution (1 mg/mL) was prepared by mixing 4.75 mL Tris Buffer with 250 μL of the Stock Substrate solution.

Using a spatula, a small amount of test gel formulation (prepared according to Example 1 above) was mixed with 20-mL deionized water in a scintillation vial. An aliquot (100 μL) of the resulting test sample solution was then transferred to a test tube and mixed with two mL of Tris Buffer Solution and one mL of Working Substrate Solution. The test tubes were viewed after 10 minutes and evaluated for yellow color formation. Controls included the neat encapsulated protease enzyme (positive control), and the gel formulation excluding enzyme (negative control).

The sample test tubes showed yellow color, indicating that the protease enzymes remained active in the gel formulations. Visual detection of yellow color was observed for gel samples and for the positive control, indicating the presence of active protease enzyme. The test tube of negative control remained colorless, indicating the absence of active protease enzyme.

Example 3

A wash study was performed on a gel detergent formulation prepared according to Example 1 above.

Wash study UD 170004 was conducted following R&D Fabric Care Test Method for Detergency, which was based on ASTM D4265. Stained/soiled test swatches were clipped onto pillowcases, were added with five pounds of ballast pillowcases in each laundry washer, and were laundered at 86° F. with 120 ppm water hardness.

The first test product consisted of a high-water unit dose gel pod without enzymes, and the enzymes were added into the wash separately from the gel pod. The second test product was a high-water unit dose gel pod containing suspended enzymes in the formulation, according to Example 1 above. Stain/soil removal was evaluated using the CIE L*, a*, b* color values obtained from reading the swatches with a spectrophotometer, and calculations for Stain Removal Index were performed following ASTM D4265.

As illustrated in FIG. 1, similar stain removal was observed from laundering with a gel containing suspended enzymes (according to the present disclosure and Example 1 above), compared to the gel with enzymes added separately in the laundry wash water. This indicated that the enzymes remained stable, and the enzymes maintained activity in the gel formulation.

Example 4

Gel detergent pods prepared according to Example 1 above were tested for stability.

To test the stability of the pods (formula+encapsulating film), the pods were placed in plastic bottles and subjected to seven (7) elevated temperature stability cycling. In each cycle, the bottles were placed in the 50° C. stability chamber overnight (or over the weekend), pulled out the next day and allowed to cool to room temperature. After each cycle, the formula in each pod was checked for changes in consistency/flow, color, phase, and appearance. The film was checked for firmness, leakage, drying, and sweating. Each sample was then graded after each cycle on a stability scale from 1-7 (1=no failure, 2=oily phase/water phase and mixed in, 3=drying the film/leaking/dry material on the film, 4=drying the film and oily/discoloration, or grainy, drying, discoloration and clumpy and separation, 5=grainy and clumpy and separation, 6=sweating of film/film getting softer, 7=complete failure). The term "stable formula" is used to designate a formula that has not undergone any changes in aesthetics, consistency, and phase. The term "stable film" is used to designate a film that has not undergone any changes in firmness, texture, flexibility, and moisture.

At room temperature (RT), the enzymes were clearly seen suspended in the gel formulation. The enzymes remained suspended in the gel formulation after seven cycles of 50° C.-RT.

With regard to film dissolution, it was found that a specific ratio of surfactants provided clarity of the gel formulation and good film stability. In particular, the high potassium carbonate concentration was found to be incompatible with certain surfactants, with the surfactants showing haziness, phase instability or phase separation. The nature and ratio of the surfactants were found to be critical in maintaining clarity of the formulation with the Carbopol ETD2623 polymer and with the high concentration of potassium carbonate. Clarity is important for the encapsulated enzymes to be clearly seen suspended in the gel formulation. For example, a 4:1 surfactant ratio of alkylpolyglucoside to alkyl ether sulfate showed clear formulations and good film stability.

Example 5

Gel detergent pods prepared according to Example 1 above were tested for cold-water film dissolution.

The unit dose pod (formulation+encapsulating film) should dissolve in cold-water (10° C.) within 10 minutes (or 600 seconds), which is the approximate duration of one laundry wash cycle. The total surfactant concentration in the gel pods was found to affect the film dissolution in cold-water.

To determine if the PVOH film encapsulating the gel formulation will dissolve in cold-water (10° C.), the film of the pod was cut and separated from the gel formulation. The film was wiped with kimwipes to remove any remaining formula on the film surface. The film was suspended (using a plastic frame) in a beaker containing ~500 mL cold-water (10° C.) and a timer was used to determine the time it took for the film to fully dissolve in cold-water. Test samples were gel pods with suspended enzymes according to the present disclosure and Example 1 above that were kept at room temperature for three (3) weeks. These gel pod test samples contained different total surfactant concentrations (but keeping the surfactant ratio 4:1 of alkylpolyglucoside: alkyl ether sulfate). Benchmark samples were commercially available laundry unit dose pods.

At >2% total surfactant concentration, the film was dissolved within 10 minutes (600 seconds) in cold-water (10° C.), similar to the benchmark pods. However, at ≤2% total surfactant concentration, the film did not dissolve within 10 minutes.

Many modifications and other embodiments of the disclosure will come to mind to one skilled in the art to which this disclosure pertains having the benefit of the teachings presented in the foregoing description; and it will be apparent to those skilled in the art that variations and modifications of the present disclosure can be made without departing from the scope or spirit of the disclosure. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An article comprising:
   an aqueous detergent comprising:
   at least about 40% by weight of water based on the total weight of the aqueous detergent,
   a polymer that is hydrated and dispersed in the water and is present in an amount sufficient to provide the aqueous detergent in the form of a gel,
   a builder comprising potassium carbonate, wherein the potassium carbonate is present in an amount of at least about 25 weight percent, based on the total weight of the aqueous detergent, and at least one surfactant;

encapsulated enzymes suspended in the aqueous detergent; and a package for the aqueous detergent, wherein the package is formed from a water-soluble film-forming material and is in direct contact with the aqueous detergent;

wherein the aqueous detergent is homogenous so as to have no observable separate phases.

2. The article of claim 1, wherein the aqueous detergent further comprises at least one enzyme which is stable at an alkaline pH.

3. The article of claim 1, wherein the encapsulated enzymes are selected from the group consisting of protease, amylase, mannanase, and a combination thereof.

4. The article of claim 1, wherein the at least one surfactant comprises:

a first surfactant, wherein the first surfactant is an anionic surfactant; and a second surfactant, wherein the second surfactant is a nonionic surfactant.

5. The article of claim 4, wherein the second nonionic surfactant and the first anionic surfactant are present in a weight ratio of about 4:1 of nonionic surfactant to anionic surfactant, on a percent actives basis.

6. The article of claim 1, wherein the at least one surfactant includes alkylpolyglucoside and alkyl ether sulfate.

7. The article of claim 6, wherein the alkylpolyglucoside and alkyl ether sulfate are present in a weight ratio of about 4:1 of alkylpolyglucoside to alkyl ether sulfate.

8. The article of claim 1, wherein the at least one surfactant is present in an amount of about 2% to about 25% percent by weight based on the total weight of the aqueous detergent.

9. The article of claim 1, wherein the water is present in an amount of about 50 to about 65 weight percent, based on the total weight of the aqueous detergent.

10. The article of claim 1, wherein the aqueous detergent further comprises at least one enzyme stabilizer.

11. The article of claim 10, wherein the at least one enzyme stabilizer is glycerin.

12. The article of claim 1, wherein the water-soluble film-forming material is polyvinyl alcohol.

13. The article of claim 1, wherein the polymer is a crosslinked hydrophobically-modified acrylic acid polymer.

14. A method of preparing an aqueous detergent composition, comprising:

mixing a polymer with water in amounts sufficient so that the aqueous detergent composition comprises at least about 40% by weight of water based on the total weight of the aqueous detergent composition and so that the polymer is hydrated and dispersed in the water so as to provide the aqueous detergent composition in the form of a gel;

adding at least one surfactant and a builder comprising potassium carbonate to the mixture of the polymer and the water with mixing so as to provide the aqueous detergent composition in a form that is homogenous and has no observable separate phases; and adding encapsulated enzymes to the aqueous detergent composition so that the encapsulated enzymes are suspended in the aqueous detergent composition.

15. The method of claim 14, further comprising encapsulating the aqueous detergent composition in a package for an aqueous gel detergent, wherein the package is in direct contact with the aqueous detergent, and wherein the package is formed from a water-soluble, film-forming material.

* * * * *